United States Patent [19]
Chen et al.

[11] Patent Number: 5,634,109
[45] Date of Patent: May 27, 1997

[54] METHOD AND SYSTEM FOR ENHANCED DATA MANAGEMENT EFFICIENCY IN MEMORY SUBSYSTEMS UTILIZING REDUNDANT ARRAYS OF DISK MEMORY DEVICES AND A NONVOLATILE CACHE

[75] Inventors: James C. Chen, San Jose; Joseph S. Glider, Palo Alto; Lloyd R. Shipman, Jr., San Jose; Jesse I. Stamness, Los Altos Hills, all of Calif.

[73] Assignee: International Business Machines Corporation, Armonk, N.Y.

[21] Appl. No.: 261,791

[22] Filed: Jun. 20, 1994

[51] Int. Cl.⁶ .................................................... G06F 12/08
[52] U.S. Cl. ................ 395/470; 395/440; 395/441; 395/463; 395/487
[58] Field of Search ........................... 395/403, 444, 395/445, 440, 441, 439, 463, 460, 461, 182.04, 470, 487

[56] References Cited

U.S. PATENT DOCUMENTS

| | | | |
|---|---|---|---|
| 5,257,352 | 10/1993 | Yamamoto et al. | 395/441 |
| 5,274,799 | 12/1993 | Brant et al. | 395/575 |
| 5,309,451 | 5/1994 | Noya et al. | 395/456 |
| 5,315,602 | 5/1994 | Noya et al. | 371/40.4 |
| 5,341,493 | 8/1994 | Yanai et al. | 395/488 |
| 5,418,921 | 5/1995 | Cortney et al. | 395/440 |
| 5,448,719 | 9/1995 | Schultz et al. | 395/182.03 |
| 5,459,853 | 10/1995 | Best et al. | 395/441 |
| 5,542,066 | 7/1996 | Mattson et al. | 395/463 |

*Primary Examiner*—Eddie P. Chan
*Assistant Examiner*—Hiep T. Nguyen
*Attorney, Agent, or Firm*—Esther Klein; Andrew J. Dillon

[57] ABSTRACT

The present system may be utilized to minimize access performance penalties in memory subsystems which utilize redundant arrays of disk memory devices. Redundant arrays of disk memory devices provide levels of reliability which are not available with single storage devices; however, the redundancy carries with it an access performance degradation due to the requirement that such systems write data segments and parity elements to the array each time an application updates data within the system. A large nonvolatile cache is therefore provided in association with a redundant array of disk memory devices. Each time a data segment is written or read the data segment is staged from the array to the nonvolatile cache, if the data segment is not already within the cache. Additionally, if the operation is an update, a parity element associated with the data segment to be updated is also staged to the cache with the existing data segment content. An updated parity element is then calculated based upon the updated data, the existing data and the existing parity element. Data segments and associated parity elements are then maintained in the cache for future reading and updates until the number of updated data segments within the cache exceeds a predetermined value. Thereafter, selected data segments and associated parity elements are destaged from the cache to the array based upon a "Least Recently Utilized" (LRU) or "minimum seek" algorithm.

17 Claims, 4 Drawing Sheets

METHOD AND SYSTEM FOR ENHANCED DATA MANAGEMENT EFFICIENCY IN MEMORY SUBSYSTEMS UTILIZING REDUNDANT ARRAYS OF DISK MEMORY DEVICES AND A NONVOLATILE CACHE

BACKGROUND OF THE INVENTION

1. Technical Field

The present invention relates in general to an improved data processing system and in particular to an improved data storage subsystem for use with a data processing system. Still more particularly, the present invention relates to an improved method and system for enhanced data management within a data storage subsystem which utilizes redundant arrays of disk memory devices.

2. Description of the Related Art

Modern computer systems often use a plurality of storage devices or memories in order to store data associated with that computer. Many such storage devices are categorized as so-called "direct access storage devices" (DASD) in that the access plan for data within such a device is effectively independent of the location of the data. One example of such a storage device is a magnetic disk drive memory.

As over all system processing speeds within modern computer systems increase, magnetic disk storage technology access times have lagged. As a consequence, several techniques have been proposed for increasing the data throughput for storage systems associated with computer systems. One such technique is the provision of a redundant array of disk memory devices. Such arrays are increasingly utilized as a result of the decreases in size and cost per megabyte for data storage within disk memory devices.

One technique for providing a redundant array of disk memory devices is the so-called "Redundant Array of Inexpensive Disks" (RAID) wherein a tightly coupled plurality of disk storage devices are arranged into an array to provide greater data throughput. These disk arrays provide a high data reliability and availability. That is, the expected time to data loss is quite long and the time spent repairing systems and recovering lost data is a small fraction of total time.

However, as is well documented in the available literature on RAID systems, the notion of redundancy can carry with it a necessary acceptance of a performance degradation as a price to be paid for significantly higher levels of availability. This performance degradation occurs as a result of the need to read parity and write both data and parity whenever an application updates data. Consequently, numerous systems for organizing data and parity within arrays of disk memory devices have been proposed in an effort to increase the access performance for such systems. However, such increased performance typically occurs in response to a substantial increase in the cost of the system, as a result of the necessary provision of mirrored disk drives or the like.

It should therefore be apparent that a need exists for a method and system for enhanced data management within a data storage subsystem which utilizes redundant arrays of disk memory devices wherein access performance degradation associated with such arrays may be minimized.

SUMMARY OF THE INVENTION

It is therefore one object of the present invention to provide an improved data processing system.

It is another object of the present invention to provide an improved data storage subsystem for use with a data processing system.

It is yet another object of the present invention to provide an improved method and system for enhanced data management within a data storage subsystem which utilizes redundant arrays of disk memory devices.

The foregoing objects are achieved as is now described. The method and system of the present invention may be utilized to minimize access performance penalties in memory subsystems which utilize redundant arrays of disk memory devices. Redundant arrays of disk memory devices provide levels of reliability which are not available with single storage devices; however, the redundancy carries with it an access performance degradation due to the requirement that such systems write data segments and parity elements to the array each time an application updates data within the system. A large nonvolatile cache is therefore provided in association with a redundant array of disk memory devices. Each time a data segment is written or read the data segment is staged from the array to the nonvolatile cache, if the data segment is not already within the cache. Additionally, if the operation is an update, a parity element associated with the data segment to be updated is also staged to the cache with the existing data segment content. An updated parity element is then calculated based upon the updated data, the existing data and the existing parity element. Data segments and associated parity elements are then maintained in the cache for future reading and updates until the number of updated data segments within the cache exceeds a predetermined value. By utilizing nonvolatile cache the likelihood of data loss due to power failures or the like can be effectively eliminated. Thereafter, selected data segments and associated parity elements are destaged from the cache to the array based upon a "Least Recently Utilized" (LRU) algorithm, or a "Minimum Seek" algorithm. A battery backup power supply may also be provided to permit all data segments and parity elements within the cache to be destroyed to the array in the even of power loss.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
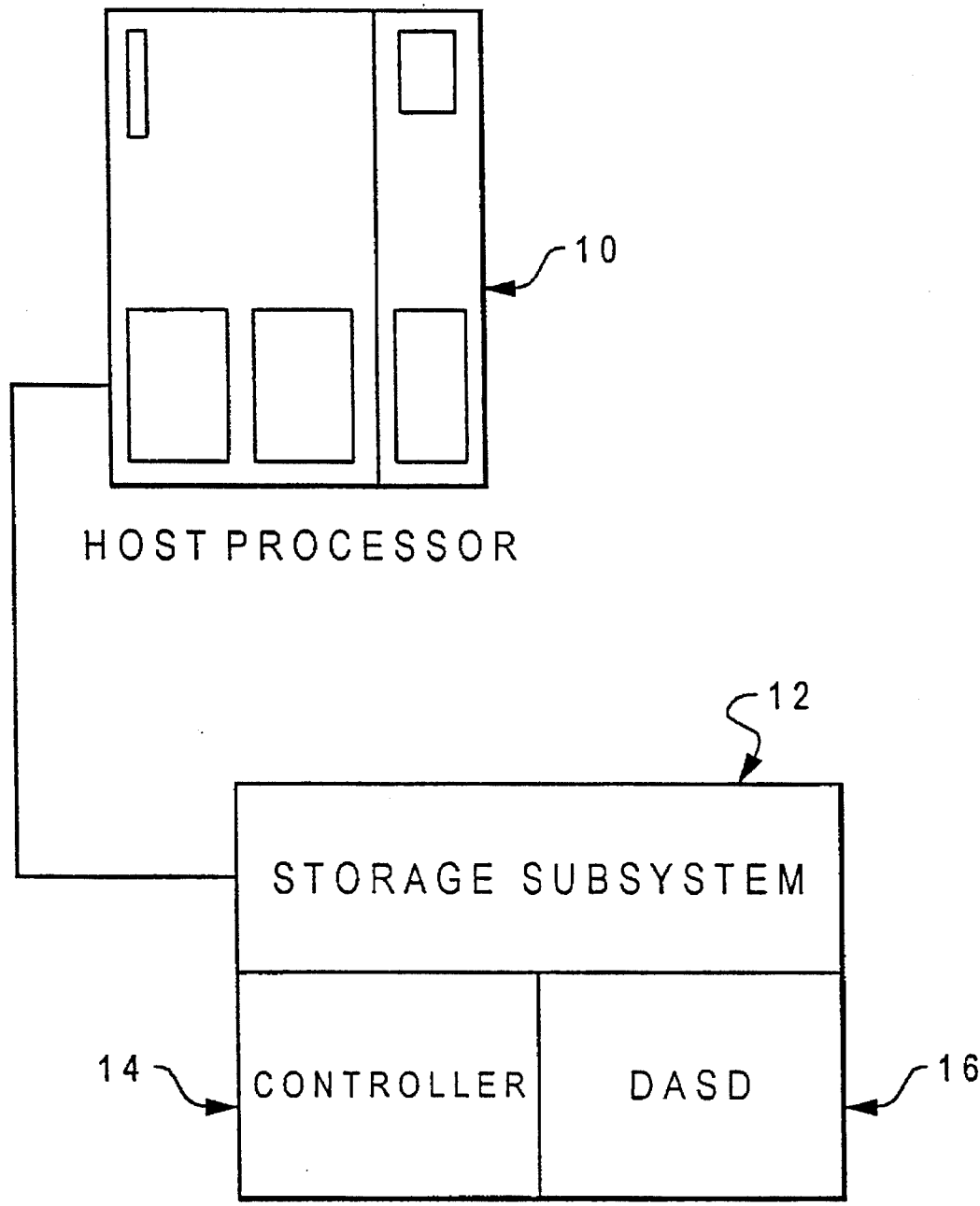
FIG. 1 is a partially schematic pictorial representation of a data processing system which may be utilized to implement the method and system of the present invention.

With reference now to the figures and in particular with reference to FIG. 1, there is depicted a partially schematic pictorial representation of a data processing system which may be utilized to implement the method and system of the present invention. As illustrated, the data processing system includes a host processor 10 which may be implemented utilizing any suitable computer such as, for example, the International Business Machines AS/400 computer. Additionally, a storage subsystem 12 is shown coupled to host processor 10. As is common in such storage subsystems a controller 14 and one or more direct access storage devices 16 are also illustrated within storage subsystem 12. Thus, in a manner which should be apparent to those having ordinary skill in the art, data utilized by host processor 10 may be stored and retrieved from one or more direct access storage devices within storage subsystem 12.

Figure 2:
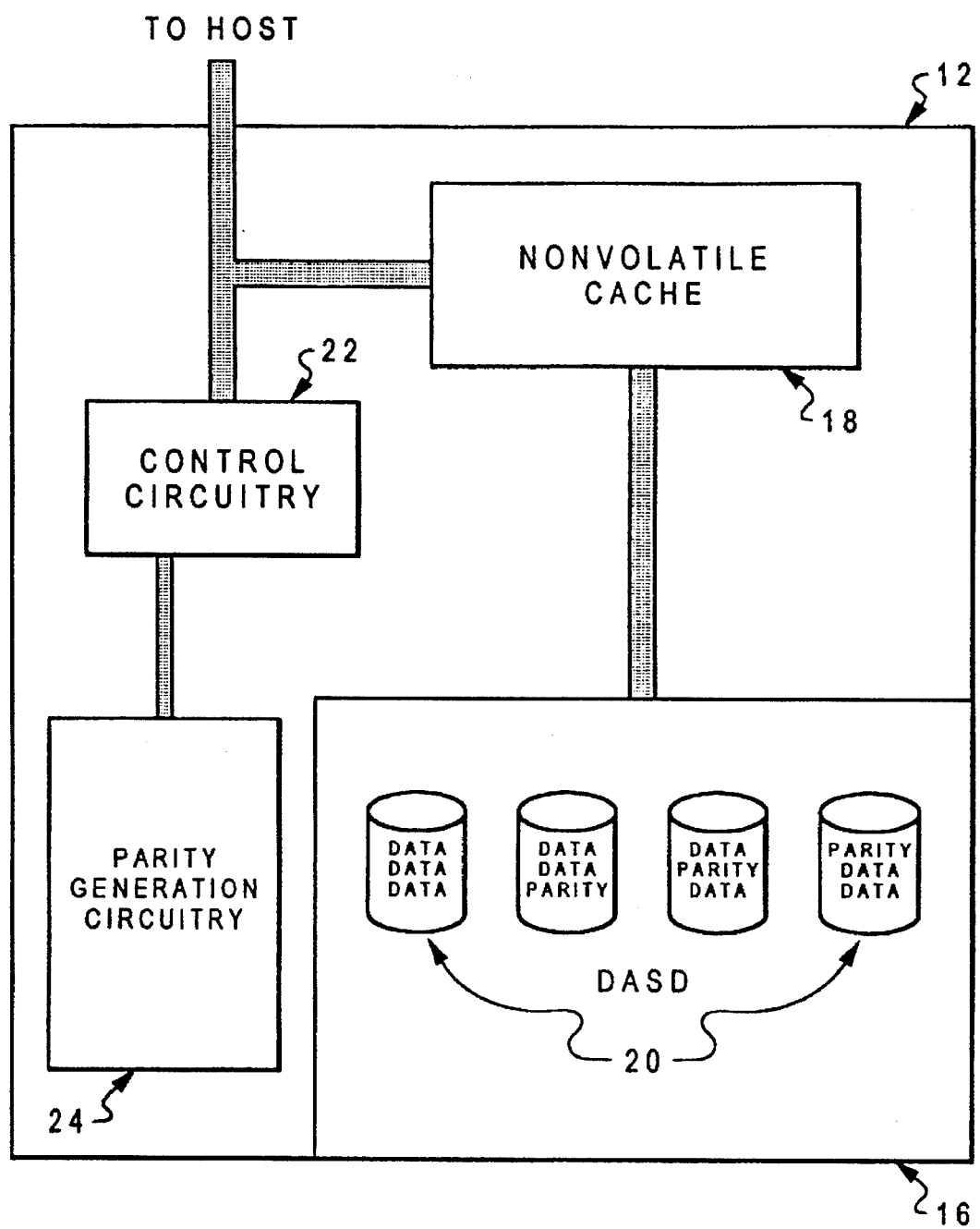
FIG. 2 is a high level block diagram of the storage subsystem of the data processing system of FIG. 1, which may be utilized to implement the method and system of the present invention.

Referring now to FIG. 2, there is depicted a high level block diagram of the storage subsystem of the data processing system of FIG. 1, which may be utilized to implement the method and system of the present invention. As illustrated, storage subsystem 12 includes multiple direct access storage devices 16. In the depicted embodiment of the present invention, direct access storage devices 16 comprise four separate so-called "head/disk assemblies" 20 which may be utilized to implement a redundant array of disk memory devices in a manner known within the art as "RAID."

In the depicted embodiment of the present invention, each disk memory device provided within direct access storage device 16 is utilized to store a plurality of data segments and a parity element associated with each group of data segments is also periodically stored at various locations throughout the array of disk memory devices in a manner known in the art as "striping." Thus, it should be apparent that each data segment stored within direct access storage devices 16 utilizing head/disk assemblies 20 must be read in conjunction with an associated parity element and each of those associated parity elements must be updated each time a data segment associated with a parity element has been updated.

Calculation of appropriate parity elements for a group of data segments is accomplished utilizing parity generation circuitry 24. While depicted as a separate element within storage subsystem 12, those skilled in the art will appreciate that parity generation circuitry 24 may comprise a software routine implemented within control circuitry 22. Parity generation circuitry 24 preferably calculates a parity element value for a group of data segments. This is typically accomplished by exclusive ORing a group of data segments together to form a parity element. Thus, a parity element for data segments $D_1$, $D_2$, and $D_3$ will be expressed mathematically as:

$$P_1 = D_1 \oplus D_2 \oplus D_3$$

It should therefore be apparent that updates to any data segment within the group of data segments represented by a parity element will result in the necessity of updating the associated parity element. Of course, it is not necessary to utilize each data segment within a group of data segments which is associated with a parity element in order to update that parity element, as the updated parity element which is associated with a group of data segments may be expressed as:

$$P_{updated} = P_1 \oplus D_{existing} \oplus D_{updated}$$

In accordance with an important feature of the present invention, a nonvolatile cache 18 is provided within storage subsystem 12. Nonvolatile cache 18 comprises a large store of nonvolatile memory which, for a storage subsystem capable of storing multiple gigabytes of data, should preferably comprise an addressable address space which includes at least thirty-two million bytes of data. In accordance with the method and system of the present invention, in a manner which will be explained in greater detail herein, control circuitry 22 may be utilized in conjunction with nonvolatile cache 18 to stage data and parity elements from direct access storage devices 16 into nonvolatile cache 18 in response to an attempted read or updating of those data segments. In the manner which will be illustrated below, parity generation circuitry 24 may be utilized to determine the updated parity for a group of data segments in response to an update to any data segment within that group and the updated parity may then be maintained within nonvolatile cache 18, greatly enhancing the access efficiency for storage subsystem 12.

Figure 3:
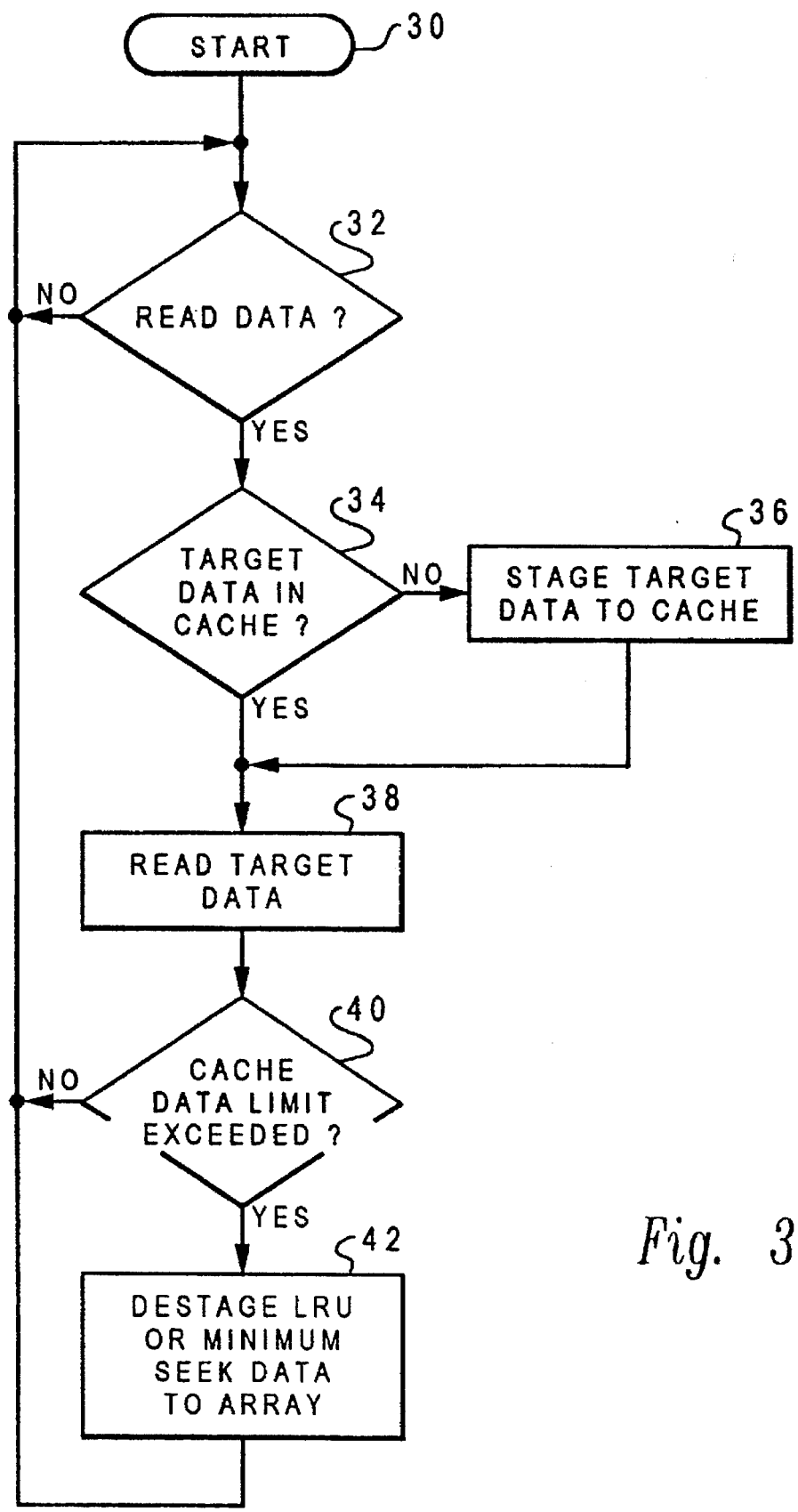
FIG. 3 is a high level logic flowchart which illustrates the method and system of the present invention with respect to data reads within the storage subsystem.

With reference now to FIG. 3, there is depicted a high level logic flowchart which illustrates the method and system of the present invention with respect to data reads within the storage subsystem of FIG. 2. As depicted, this process begins at block 30 and thereafter passes to block 32. Block 32 illustrates a determination of whether or not data is to be read from direct access storage devices 16. If not, this process merely iterates until such time as a read operation occurs.

Still referring to block 32, in the event a read operation has been initiated the process passes to block 34. Block 34 illustrates a determination of whether or not the target data is within nonvolatile cache 18. If not, the process passes to block 36 which illustrates the staging of the target data to nonvolatile cache 18. Thereafter, or after determining that the target data is within nonvolatile cache 18, the process passes to block 38. Block 28 illustrates the reading of the target data.

Next, the process passes to block 40 which depicts a determination of whether or not the cache data limit has been exceeded by the possible addition of target data to the cache. If the cache data limit has not been exceeded, the process merely returns to block 32 in an iterative fashion to await the next read operation for data within direct access storage devices 16. Alternately, in the event the cache data limit has been exceeded, as determined in block 40, the process passes to block 42. Block 42 illustrates the destaging of the "Least Recently Utilized" (LRU) or "Minimum Seek" data segment from nonvolatile cache 18 to the array of disk memory devices within direct access storage devices 16. Those having ordinary skill in the art will appreciate that the "Least Recently Utilized" (LRU) algorithm is a well known technique for updating and maintaining cache contents within the data processing system art. The "Minimum Seek" algorithm involves destaging the data within the cache which requires the shortest "seek" time to arrive at the appropriate storage location to the array of disk storage devices.

Figure 4:
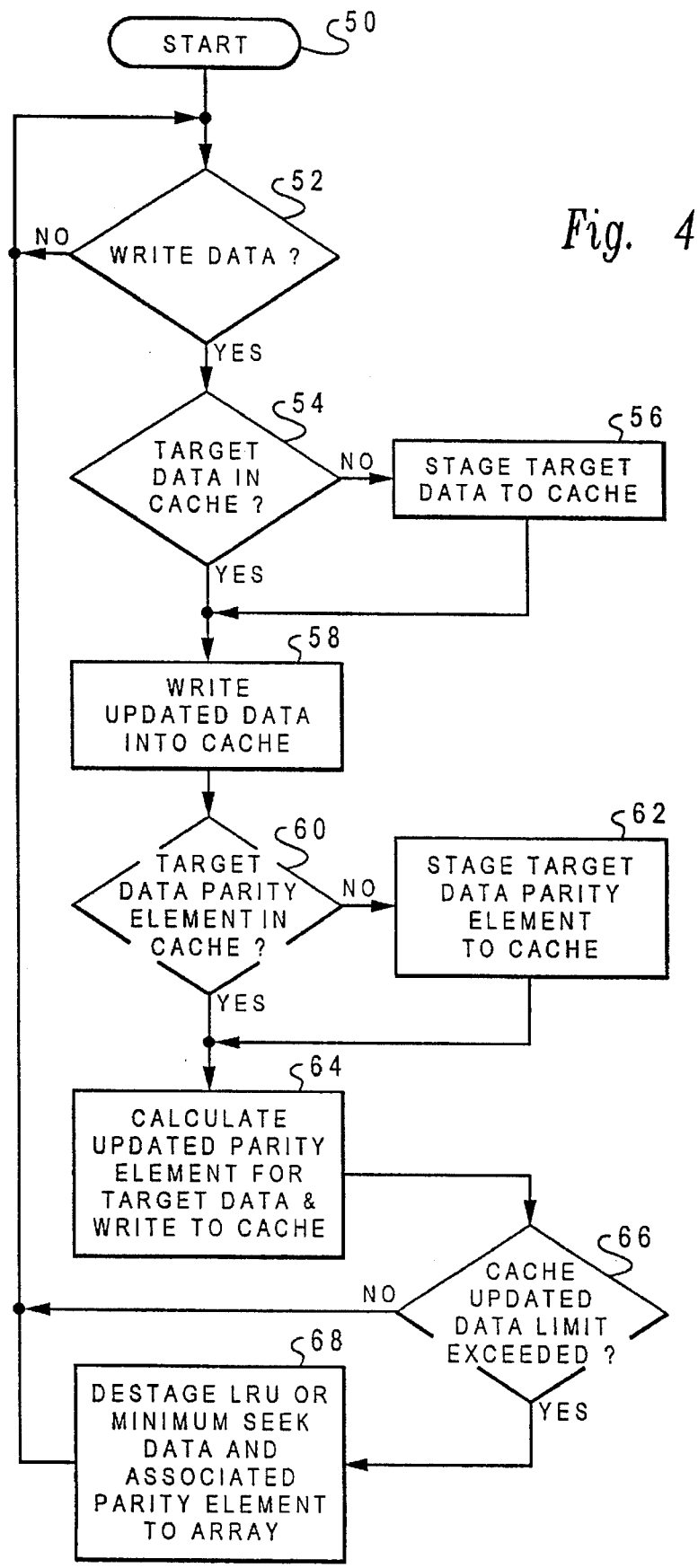
FIG. 4 is a high level logic flowchart which illustrates the method and system of the present invention with respect to updates to data within the memory storage subsystem.

Finally, referring to FIG. 4, there is depicted a high level logic flowchart which illustrates the method and system of the present invention with respect to updates to data within a memory storage subsystem. As depicted, this process begins at block 50 and thereafter passes to block 52. Block 52 illustrates a determination of whether or not an update has occurred which will result in the writing of data to direct access storage devices 16. If not, this process merely iterates until such time as such an update occurs.

Still referring to block 52, in the event an update occurs which will result in a writing of data to direct access storage devices 16, the process passes to block 54. Block 54 illustrates a determination of whether or not the target data segment is present within nonvolatile cache 18 and if not, the process passes to block 56. Block 56 depicts the staging of the target data segment to nonvolatile cache 18. Thereafter, or after determining that the target data segment was present within nonvolatile cache 18, the process passes to block 58. Block 58 illustrates the writing of the updated data value into nonvolatile cache 18.

Next, in accordance with an important feature of the present invention, the process passes to block 60. Block 60 illustrates a determination of whether or not the target data segment associated parity element is present within nonvolatile cache 18. If not, the process passes to block 62 which illustrates the staging of the target data segment associated parity element to nonvolatile cache 18. Thereafter, or after determining that the target data segment associated parity element is present within nonvolatile cache 18, block 64 illustrate the calculation of an updated parity element for the target data segment and the writing of that updated parity element to nonvolatile cache 18. In this manner, as those skilled in the art will appreciate upon reference to this specification, an image of an updated track or segment of data may be efficiently maintained within nonvolatile cache by virtue of the fact that the associated parity element for each group of data therein can be maintained within the cache without requiring an access to the disk memory devices within direct access storage device 16, greatly enhancing the efficiency of the storage subsystem.

Next, the process passes to block 66. Block 66 illustrates a determination of whether or not the cache updated data segment limit has been exceeded. That is, is the number of updated memory segments within nonvolatile cache 18 greater than a selected number which limits the amount of free space within nonvolatile cache 18. If not, the process merely returns to block 52 in an iterative fashion to await a subsequent update to a data segment within direct access storage devices 16. Alternately, if the number of updated memory segments within nonvolatile cache 18 has exceeded the predetermined number, the process passes to block 68. Block 68 illustrates the destaging of the "Least Recently Utilized" (LRU) or "Minimum Seek" data and its associated parity element to the array of disk memory devices within direct access storage devices 16.

As described herein a nonvolatile cache is utilized to prevent data loss in the event of power failure. Additionally, a battery backup system may be utilized to provide power for destaging data from the cache to the array in the event of power loss, providing an ordered shut down procedure.

Upon reference to the foregoing those skilled in the art will appreciate that by the addition of nonvolatile caching to the management process of a redundant array of disk memory devices, the access performance penalty normally associated with such arrays may be minimized. This is not strictly a result of the expected performance enhancement which accompanies caching in non-array memory systems, but results in an increased performance capability as a result of the ability of the system to manage cache images and parity elements for that data within a nonvolatile cache, without requiring access to the storage media to update the parity element. This technique permits subsequent updates to a group of data segments to proceed without access to the storage media within the disk memory devices and thus facilitates destaging of groups of memory segments on a least recently utilized basis while simplifying the task of maintaining data consistency across the storage array.

While the invention has been particularly shown and described with reference to a preferred embodiment, it will be understood by those skilled in the art that various changes in form and detail may be made therein without departing from the spirit and scope of the invention.

We claim:

1. A method for enhanced data management in a memory storage subsystem which includes a nonvolatile cache and a redundant array of disk memory devices for storing a plurality of data segments and associated parity elements, said method comprising the steps of:

determining if a selected data segment and an associated parity element are present within said nonvolatile cache in response to an attempted update to said selected data segment;

staging said selected data segment and an associated parity element into said nonvolatile cache from said redundant array of disk memory devices in response to a determination that said selected data segment and an associated parity element are not present within said nonvolatile cache;

updating both said selected data segment and said associated parity element;

writing said updated selected data segment and said updated associated parity element into said nonvolatile cache; and destaging a data segment and an associated parity element from said nonvolatile cache into said redundant array of disk memory devices only in response to a number of updated data segments within said nonvolatile cache exceeding a predetermined number wherein access performance degradation associated with redundant arrays of disk memory devices is minimized.

2. The method for enhanced data management in a memory storage subsystem according to claim 1, further including the step of determining if a particular data segment is present within said nonvolatile cache in response to an attempted read of said particular data segment.

3. The method for enhanced data management in a memory storage subsystem according to claim 2, further including the step of staging said particular data segment without a parity element into said nonvolatile cache from said redundant array of disk memory devices in response to a determination that said particular data segment is not present within said nonvolatile cache.

4. The method for enhanced data management in a memory storage subsystem according to claim 1, wherein said step of updating both said selected data segment and said associated parity element comprises the step of updating said selected data segment and calculating a new parity element for association with said updated selected data segment.

5. The method for enhanced data management in a memory storage subsystem according to claim 4, wherein said step of calculating a new parity element for association with said updated selected data segment comprises the step of exclusive ORing said associated parity element, said selected data segment and said updated selected data segment.

6. The method for enhanced data management in a memory storage subsystem according to claim 1, wherein said step of destaging a data segment and an associated parity element from said nonvolatile cache into said redundant array of disk memory devices only in response to a number of updated data segments within said nonvolatile cache exceeding a predetermined number comprises the step of destaging a least recently utilized (LRU) data segment and an associated parity element from said nonvolatile cache into said redundant array of disk memory devices only in response to a number of updated data segments within said nonvolatile cache exceeding a predetermined number.

7. The method for enhanced data management in a memory storage subsystem according to claim 1, wherein said step of destaging a data segment and an associated parity element from said nonvolatile cache into said redundant array of disk memory devices only in response to a number of updated data segments within said nonvolatile cache exceeding a predetermined number comprises the step of destaging a minimum seek data segment and an associated parity element from said nonvolatile cache into said redundant array of disk memory devices only in response to a number of updated data segments within said nonvolatile cache exceeding a predetermined number.

8. A data processing system for permitting enhanced data management, said data processing system comprising:

a host processor;

a data storage subsystem, said data storage subsystem comprising:

a nonvolatile cache;

a redundant array of disk memory devices for storing a plurality of data segments and associated parity elements;

a control circuit for staging an image of a selected data segment and an associated parity element from said redundant array of disk memory devices into said nonvolatile cache in response to an attempted update thereto, for updating said selected data segment and said associated parity element, and writing said updated selected data segment and such updated associated parity element into said nonvolatile cache; and destaging means for destaging a data segment and an associated parity element from said non-volatile cache to said redundant array of disk memory devices only in response to a number of updated segments within said non-volatile cache exceeding a predetermined number, wherein access performance degradation associated with redundant arrays of disk storage devices is minimized.

9. The data processing system according to claim 8, wherein said control circuit further includes means for staging an image of a particular data segment without an associated parity element from said redundant array of disk memory devices into said nonvolatile cache in response to an attempted read of said particular data segment.

10. The data processing system according to claim 8, wherein said control circuit further includes means for calculating an updated parity element for association with an updated selected data segment by exclusive ORing said associated parity element, said selected data segment and said updated selected data segment.

11. The data processing system according to claim 8, wherein said destaging means comprises means for destaging a least recently utilized (LRU) data segment and an associated parity element from said nonvolatile cache to said redundant array of disk memory devices only in response to a number of updated data segments within said nonvolatile cache exceeding a predetermined number.

12. The data processing system according to claim 8, wherein said destaging means comprises means for destaging a minimum seek data segment and an associated parity element from said nonvolatile cache to said redundant array of disk memory devices only in response to a number of updated data segments within said nonvolatile cache exceeding a predetermined number.

13. A data storage subsystem for permitting the efficient management of data stored therein, said data storage subsystem comprising:

a nonvolatile cache;

a redundant array of disk memory devices for storing a plurality of data segments and associated parity elements;

a control circuit for staging an image of a selected data segment and an associated parity element from said redundant array of disk memory devices into said nonvolatile cache in response to an attempted update thereto, for updating said selected data segment and said associated parity element, and writing said updated selected data segment and said updated associated parity element into said nonvolatile cache; and destaging means for destaging a data segment and an associated parity element from said nonvolatile cache to said redundant array of disk memory devices only in response to a number of updated data segments within said nonvolatile cache exceeding a predetermined number wherein access performance degradation associated with redundant arrays of disk storage devices is minimized.

14. The data processing system according to claim 13, wherein said control circuit further includes means for staging an image of a particular data segment without an associated parity element from said redundant array of disk memory devices into said nonvolatile cache in response to an attempted read of said particular data segment.

15. The data processing system according to claim 13, wherein said control circuit further includes means for calculating an updated parity element for association with an updated selected data segment by exclusive ORing said associated parity element, said selected data segment and said updated selected data segment.

16. The data processing system according to claim 13, wherein said destaging means comprises means for destaging a least recently utilized (LRU) data segment and an associated parity element from said nonvolatile cache to said redundant array of disk memory devices only in response to a number of updated data segments within said nonvolatile cache exceeding a predetermined number.

17. The data processing system according to claim 13, wherein said destaging means comprises means for destaging a minimum seek data segment and an associated parity element from said nonvolatile cache to said redundant array of disk memory devices only in response to a number of updated data segments within said nonvolatile cache exceeding a predetermined number.

* * * * *